United States Patent [19]

Lee et al.

[11] Patent Number: 5,844,772

[45] Date of Patent: Dec. 1, 1998

[54] PORTABLE ELECTRONIC APPARATUS WITH ELEMENTS FOR PREVENTING SHOCK AND WATER

[75] Inventors: Cheon-Yeol Lee, Seoul; Phil-Kyu Choi, Suwon, both of Rep. of Korea

[73] Assignee: Samsung Electronics Co., Ltd., Kyungki-Do, Rep. of Korea

[21] Appl. No.: 428,621

[22] Filed: Apr. 25, 1995

[30] Foreign Application Priority Data

Apr. 26, 1994 [KR] Rep. of Korea ............... 1994 8838
May 10, 1994 [KR] Rep. of Korea ............... 1994 10314

[51] Int. Cl.⁶ .......................... G06F 1/16; H05K 5/06
[52] U.S. Cl. ........................................................ 361/683
[58] Field of Search ..................... 364/708.1; 277/180, 277/611, 638; 312/223.1, 223.2, 296; 439/136; 174/52.3; 361/679–687, 724–732

[56] References Cited

U.S. PATENT DOCUMENTS

4,629,268  12/1986  Hiles ........................................ 439/136
5,419,626   5/1995  Crockett ............................. 312/223.2 X

*Primary Examiner*—Michael W. Phillips
*Attorney, Agent, or Firm*—Cushman Darby & Cushman IP Group of Pillsbury Madison & Sutro LLP

[57] ABSTRACT

An anti-shock and water-resistant housing for enclosing the internal structure of a portable electronic apparatus comprising a hard housing body molded of plastic material whose mechanical strength is sturdy when shaped and finished, and resilient layer on said hard housing body in conformity with the shape of the outer surface of the housing body. The resilient layer is molded of synthetic resin which shows resilient characteristic like rubber when shaped and finished.

18 Claims, 9 Drawing Sheets

PORTABLE ELECTRONIC APPARATUS WITH ELEMENTS FOR PREVENTING SHOCK AND WATER

BACKGROUND OF THE INVENTION (1) Field of the Invention

The present invention relates to a portable electronic apparatus such as notebook computer, pen computer, handphone, etc., and more particularly to a housing for enclosing the inner structure of such an apparatus.

(2) Description of the Prior Art

Conventionally, the housing for enclosing the inner structure of a portable electronic apparatus such as notebook computer, pen computer, handphone, etc. is shaped by plastic molding using acrylo butylene styrene (ABS) or a composition of ABS and polycarbonate (PC).

Such a housing is so weak that it may be fractured and also result in the failure of the inner functional structure when dropped to the ground or exposed to shock. In addition, many cases occur losing caps for keyboard or input/output ports in a pen computer.

SUMMARY OF THE INVENTION

It is an object of the present invention to provide an anti-shock and water resistant housing for enclosing the internal structure of a portable electronic apparatus.

It is another object of the present invention to provide a process for manufacturing an anti-shock and water-resistant housing for enclosing the internal structure of a portable electronic apparatus.

It is a further object of the present invention to provide a process for forming a resilient layer on the housing of a portable electronic apparatus.

It is further another object of the present invention to provide a means for preventing the loss of the caps for covering the input/output ports of a pen computer.

It is further another object of the present invention to provide a process for forming the key buttons of a handphone or portable computer integrally with a resilient anti-shock layer coated on the outer surface of the housing according to the present invention.

According to the present invention, a process for manufacturing an anti-shock and water-resistant housing for enclosing the internal structure of a portable electronic apparatus comprises the steps of preparing a hard housing body molded of plastic material whose mechanical strength is hard when shaped and finished, and forming a resilient layer on said hard housing body in conformity with the shape of the outer surface of said housing body. The resilient layer is molded of synthetic resin which shows resilient characteristic like rubber when shaped and finished.

According to a preferred embodiment of the present invention, the housing body is prepared by using acrylo butylene styrene(ABS) or a composition of ABS and polycarbonate(PC) while the resilient layer is prepared by using block copolymers. The block copolymer is preferably composed by mixing polybutylene terephthalate(PBT) with hard mechanical property and long-chain polyether glycols with soft mechanical property. It is also preferable to use HYTREL resin manufactured by Dupont Company as the block copolymer.

According to another preferred embodiment of the present invention, the resilient layer is shaped to have a plurality of protuberances positioned in correspondence with the positions of a plurality of the operating switches mounted inside of the housing body. The protuberances are formed so as to work the operating switches when pressed by fingers. In addition, the upper portions of the protuberances contacted by fingers is hemispherically shaped and the opposite lower portions contacted with the operating switches shaped cylindrically.

According to another preferred embodiment of the present invention, an anti-shock and water-resistant housing for enclosing the internal structure of a portable computer comprises a hard housing body, a resilient layer formed on the outer surface of the housing body in conformity with the shape thereof, input/output ports, caps for covering the input/output ports and flexible connecting members for connecting the housing body and the caps.

The connecting members are formed to have hook portions for hooking the housing body at one end and ring-shaped portions for holding the caps at the other end. The hook portions are made of resilient material so that they may be folded and recovered to hook the housing body when they are inserted into slits of the housing.

The caps are formed to have resilient tube-like protuberances fitted into the ring-shaped portions. The tube-like protuberances are prepared to expand their middle portion to clutch the ring-shaped portions when stoppers with a diameter greater than the inner diameter of the tube-like protuberances are inserted into the openings of the tube-like protuberances.

The stoppers are so formed as to have the shape of a reversed truncated cone with the height being about half the depth of the opening of the tube-like protuberances. The diameter of the upper end of the stopper is formed greater than the inner diameter of the tube-like protuberances and the diameter of the lower end. The present invention will now be described more specifically with reference to the drawings attached only by way of example.

DETAILED DESCRIPTION OF THE PRESENT INVENTION

Figure 1:
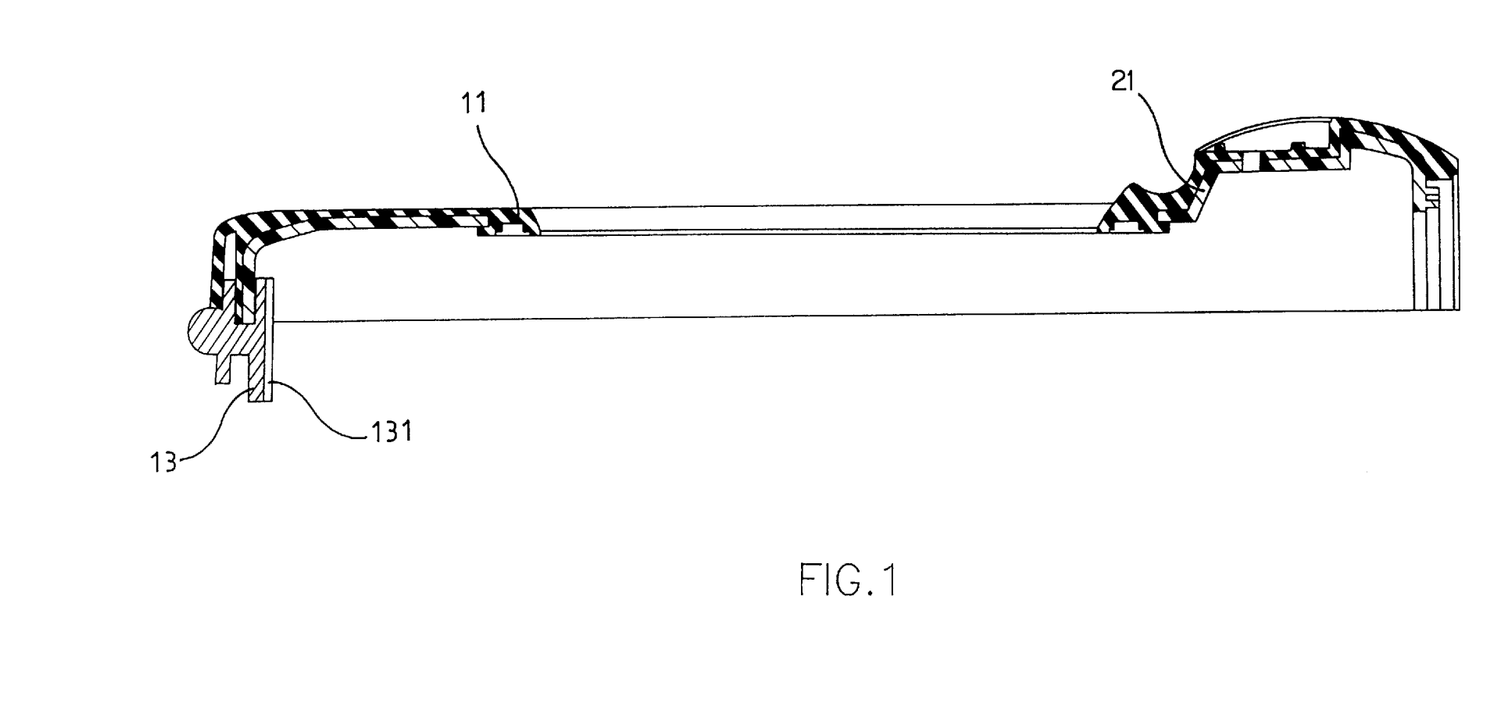
FIG. 1 is a cross-section of the upper cover of a housing body for enclosing the internal structure of a portable computer, showing a resilient layer coated on the upper cover according to an embodiment of the present invention.

As shown in FIG. 1 according to an embodiment of the present invention, an anti-shock and water resistant housing for enclosing the internal structure of a portable electronic apparatus comprises a housing body whose outer surface is coated with a resilient layer 11 made of rubber-like material. The housing body comprises an upper cover 21 and a lower cover (not shown in FIG. 1), which are connected with a main gasket 13 interposed between them.

Attached to the main gasket 13 is a gasket support 131 to secure the relative position of the upper cover and lower cover so that the two covers are separated when the housing is shocked. The upper and lower covers of the housing body are molded of plastic material whose mechanical strength is hard when shaped and finished. The outer surface of the housing body is coated with a resilient layer 11 in conformity with its shape. The resilient layer 11 is molded of synthetic resin which gives resilient characteristic like rubber when shaped and finished.

The plastic material used in preparing the upper and lower covers is acrylo butylene styrene(ABS) or a composition of ABS and polycarbonate(PC), and the synthetic resin used to form the resilient layer 11 is a block copolymer which is preferably HYTREL resin Du Pont company composed of polybutylene terephthalate(PBT) with hard mechanical property and long-chain polyether glycols with soft mechanical property. A conventional molding process is used to fabricate the inventive housing. According to an embodiment of the present invention, the resilient layer is preferably formed to have a thickness of 1.2 to 2.0 mm.

Figure 2:
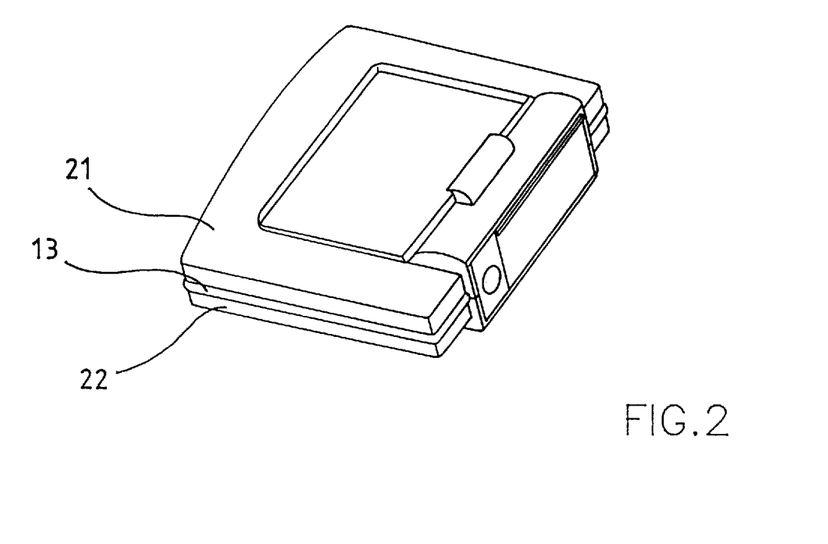
FIG. 2 is a perspective view for illustrating the upper surface of the housing of a portable computer in which the present invention is preferably embodied.
Figure 3:
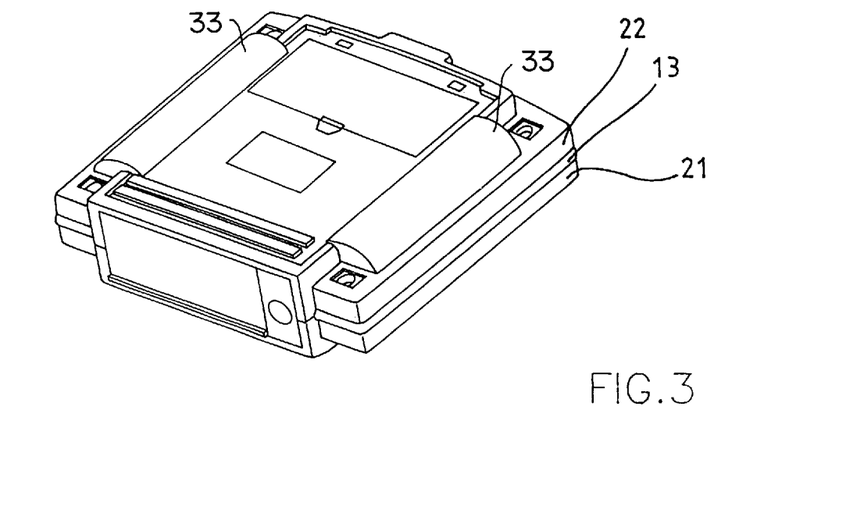
FIG. 3 is a perspective view for illustrating the lower surface of the housing shown in FIG. 2.
Figure 4:
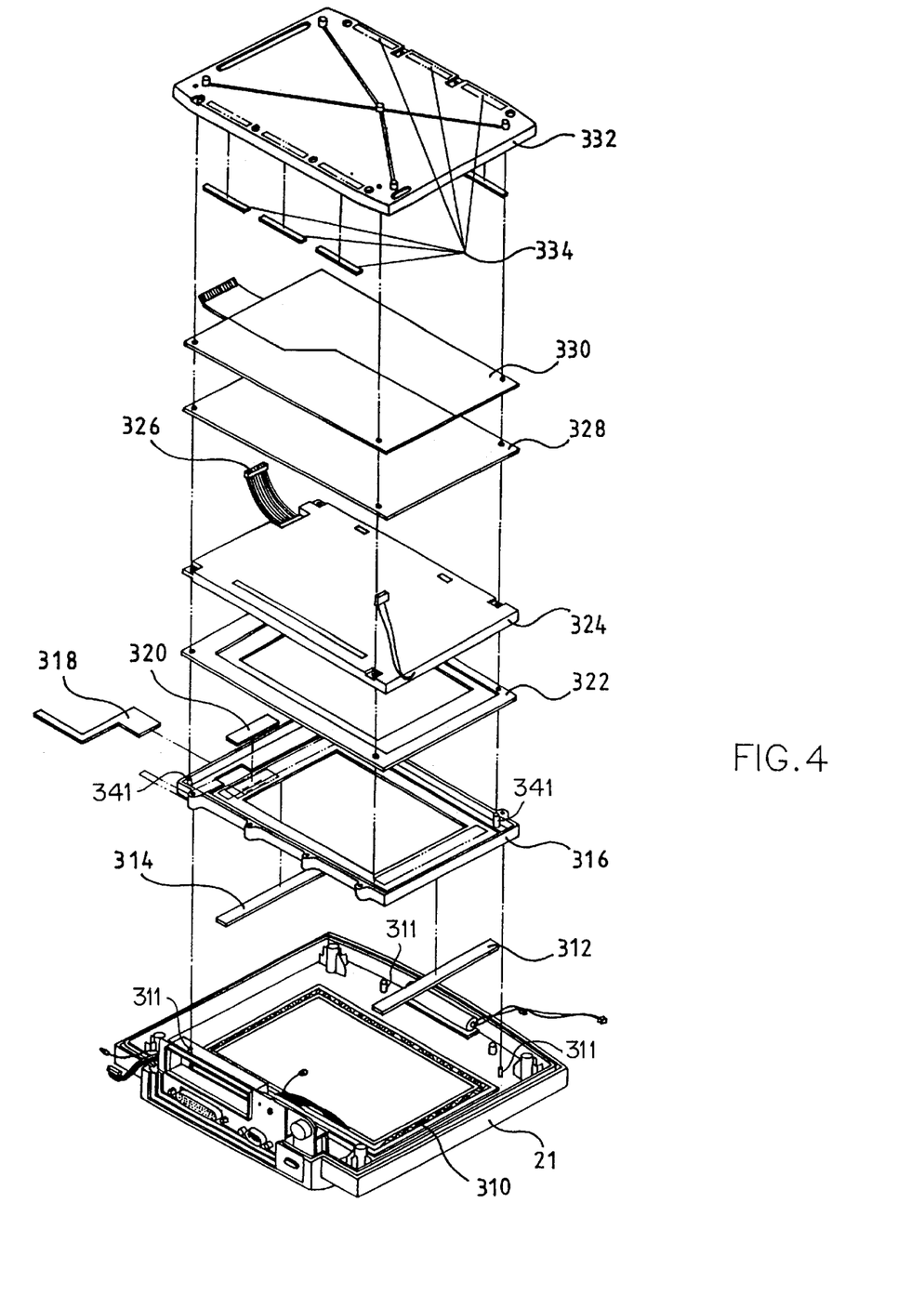
FIG. 4 is an exploded perspective view for illustrating the assemblage of the upper cover of the housing according to an embodiment of the present invention.

The inventive upper and lower covers 21 and 22 are assembled together with the main gasket 13 as schematically shown in FIGS. 2 and 3. Referring to FIG. 3, the lower cover 22 has a pair of supporting means 33 formed integrally with it to hold a computer steady. Referring to FIG. 4, there are described the steps for mounting the parts in an inventive housing.

At first, a tray gasket 310 is placed on a flange formed around the internal space of the upper cover 21 for receiving LCD panel 324 so as to absorb shocks that may occur between the upper cover 21 and the part placed on the upper cover. A number of bosses 311 are protruding from an internal part of the upper cover 21. On the tray gasket 310 is mounted a lower support frame 316 with a pair of pads 312 and 314 attached to the left and right bordering surfaces of the lower support frame 316 which has a number of bosses 341.

The LCD panel 324 is mounted on the lower support frame 316. A tape 320 is attached to a left bordering portion of the upper surface of the lower support frame 316 and a communication cable 318 complying with the standard of FCC(Federal Communications Commissions). A gasket 322 is placed on the lower support frame 316 on which the LCD panel 324 is mounted with a cable 326 attached to the left side of it.

On the LCD panel 324 is placed a gasket 328 on which is mounted a digitizer 330 for processing the input signals of a pen computer. An upper support plate 332 is mounted on the digitizer 330 with six pieces 334 of shock absorbing materials interposed between them. The upper supporting plate 332 is made of a magnesium alloy with a good mechanical strength to prevent the distortion of the LCD panel 324. Meanwhile, although not shown in FIG. 4, the main circuit board of a computer system is mounted on the upper supporting plate 332, having a structure as shown in FIG. 6.

Figure 5:
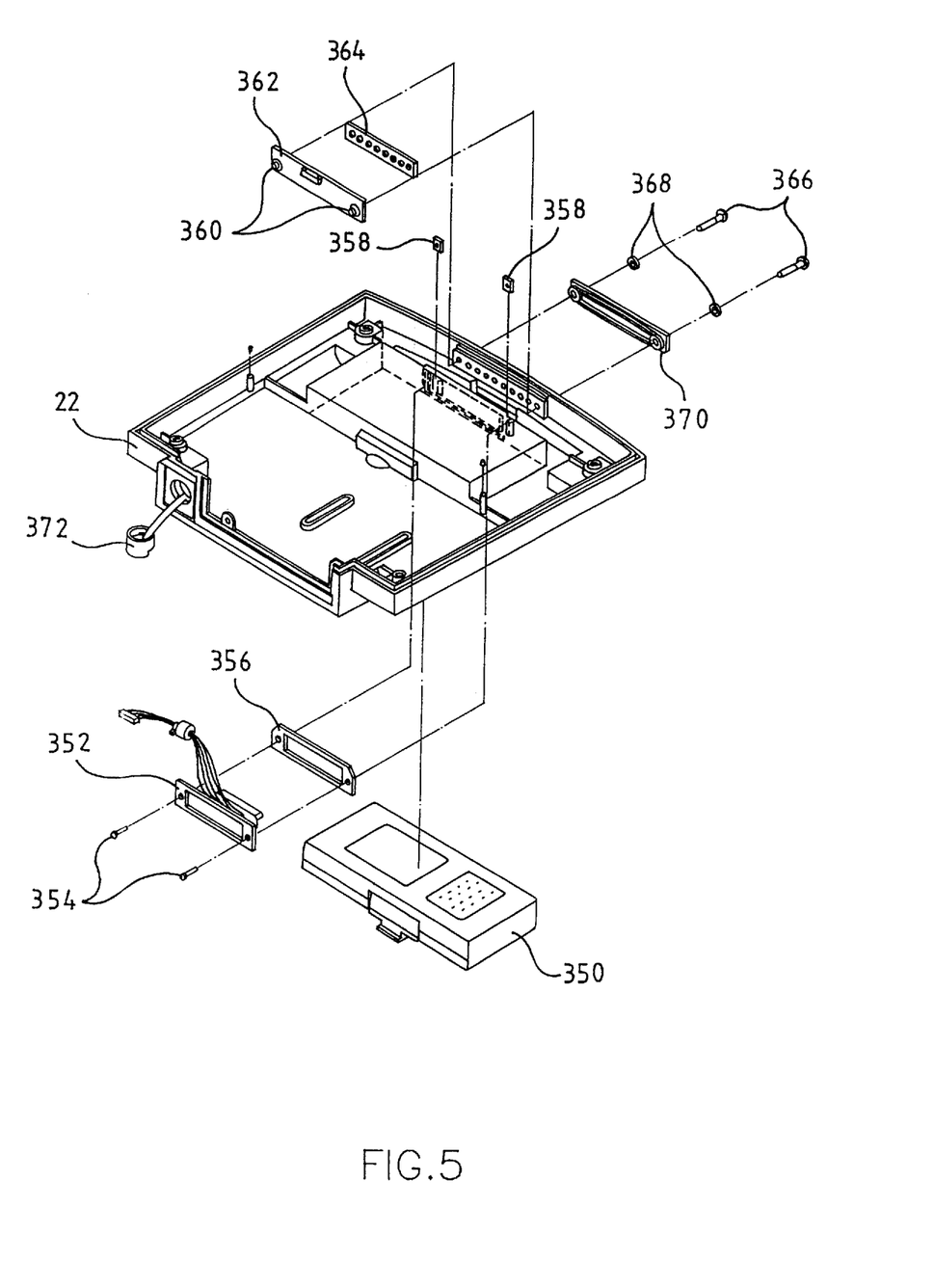
FIG. 5 is an exploded perspective view for illustrating the assemblage of the lower cover of the housing shown in FIG. 4.

Referring to FIG. 5, there are described the procedure for mounting the internal parts of a portable computer in the inside of the lower cover 22. The lower cover 22 has a space formed in the rear part thereof for receiving a battery 350 whose back end surface is associated with battery pin 352 and gasket 356 by means of screws 354.

A pair of brackets 358 are connected to the gasket 356 against which an infrared ray board 362 with holding means 360 is attached together with a gasket 364. The infrared ray board 362 is to communicate with external mechanism, and the gasket 364 to absorb shocks occurring between the plate 362 and lens 370. The lens 370 and gasket 368 are mounted against the gasket 364 by means of bolt 366. The gasket 368 is to prevent the lens 370 from being damaged by the bolt 366.

Figure 6:
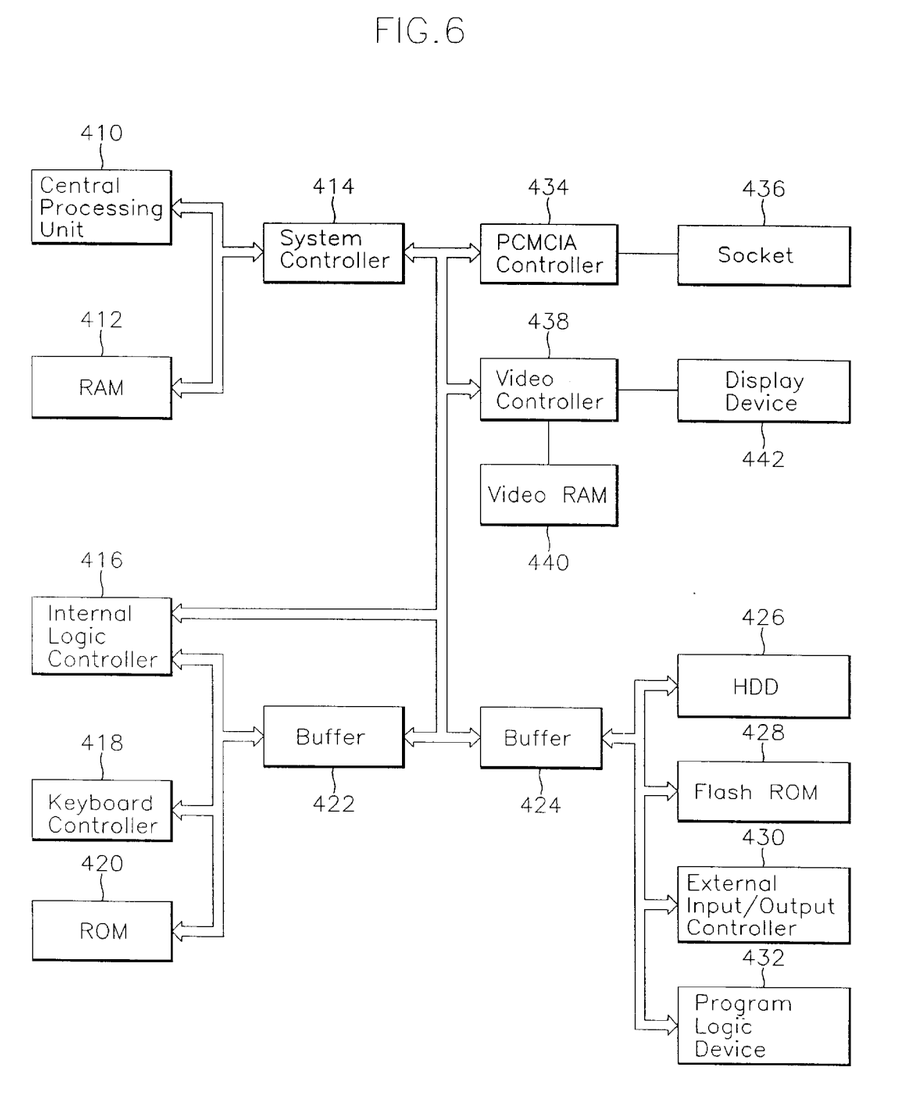
FIG. 6 is a block diagram for illustrating the system board of a computer fitted into the housing according to the present invention.

Referring to FIG. 6 for illustrating schematically the structure of the main circuit board of a computer, its operating principles are described in brief. The central processing unit (CPU) 410 is connected with a random access memory (RAM) 412 and a system controller 414 via local bus.

The CPU is one of microprocessor chips 486DX, 486DX2, etc. The RAM 412 is used as the main memory of the system and has a capacity of 4 MB, 8 MB, 16 MB, etc. The capacity of the RAM 412 may be expanded by using JEDEC memory, etc. The system controller 414 is also connected with system bus to interface the CPU 410 and local buses, while working as a DRAM controller and power manager.

An internal logic controller 416 is connected by local buses with a keyboard controller 418, a ROM 420, a buffer 422 and the system bus to control the parallel port, interrupt and direct memory access (DMA) and includes a timer and real time clock (RTC) to provide the system with standard time.

The keyboard controller 418 generates scan codes of the keyboard interrupted and transferred to the CPU 410 via local buses, the buffer 422, the system bus and the system controller 414. The ROM 420 stores basic input output system (BIOS) program, various interrupt service routine and power on self test (POST) program executed on booting of the system.

The buffer 422 interfaces the system bus with the local buses connecting the internal logic controller 416, keyboard controller 418 and ROM 420. PCMCIA (Personal Computer Memory Card International Association) controller 434 has at least one socket 436 designed to be connected with a memory card even during power-on state of the system.

A video controller 438 connected to the system bus is also connected with a display 442 and a video RAM 440 to generate color signal, synchronizing signal, clock signal and color level signal from video data produced by the CPU 410. The video data is temporarily stored in the video RAM 440. The above generated signals are inputted to the display 442. A buffer 424 interfaces the system bus and local buses connecting a hard disk 426, a flash ROM 428, an external input/output controller 430 and a program logic device 432.

The hard disk 426 includes a hard disk controller and the flash ROM 428 stores the operating system and utility programs. The external input/output controller 430 includes a logic circuit for interfacing the hard disk through addressing and controls serial ports such as the floppy disk drive and printer port. The program logic device 432 is a programmable logic array including the bus control logic circuit of the buffers 422 and 424 connected with the system bus.

The following table is a specification to show the result of a shock test of a pen computer.

| SHOCK TEST | | | |
|---|---|---|---|
| Height | Contact Material | Number of Repetition | Structure |
| 4 feet | Concrete | 5 | No HDD |
| 3 feet | Concrete | 5 | 1.3" HDD |
| 2 feet | Concrete | 5 | 1.8" HDD |

In the above table, the height represents a distance through which a pen computer is dropped, the contact material represents the ground material with which the pen computer collides, the number of repetition represents the number of dropping the pen computer, and the structure represents whether the pen computer contains a hard disk.

Conventionally, a vibration test is to subject a pen computer to a vibrating motion made at the maximum resonance frequency for 15 minutes. The inventive pen computer was subjected to 0.5 G's during operation and to 1.0 G's during inoperative state. The inventive pen computer passed the above tests showing a good mechanical property.

Meanwhile, it is hardly possible to attach the caps for the input/output ports by hinges because the inventive housing body of a pen computer is coated with a rubber-like resilient layer.

Furthermore, since the keyboard is not frequently used in a portable pen computer, it is necessary to provide means for preventing the cap of the keyboard from being lost. According to the present invention, the housing of a pen computer is provided with means for preventing the caps of the input/output and keyboard ports from being lost.

Figure 7:
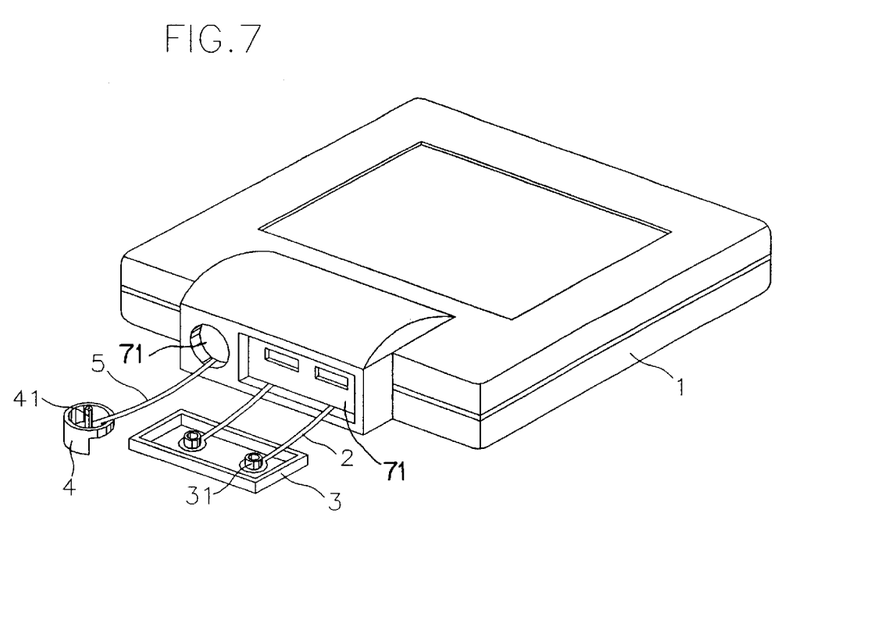
FIG. 7 is a perspective view of a portable computer for illustrating the caps for covering the input/output ports of a portable computer according to an embodiment of the present invention.
Figure 8:
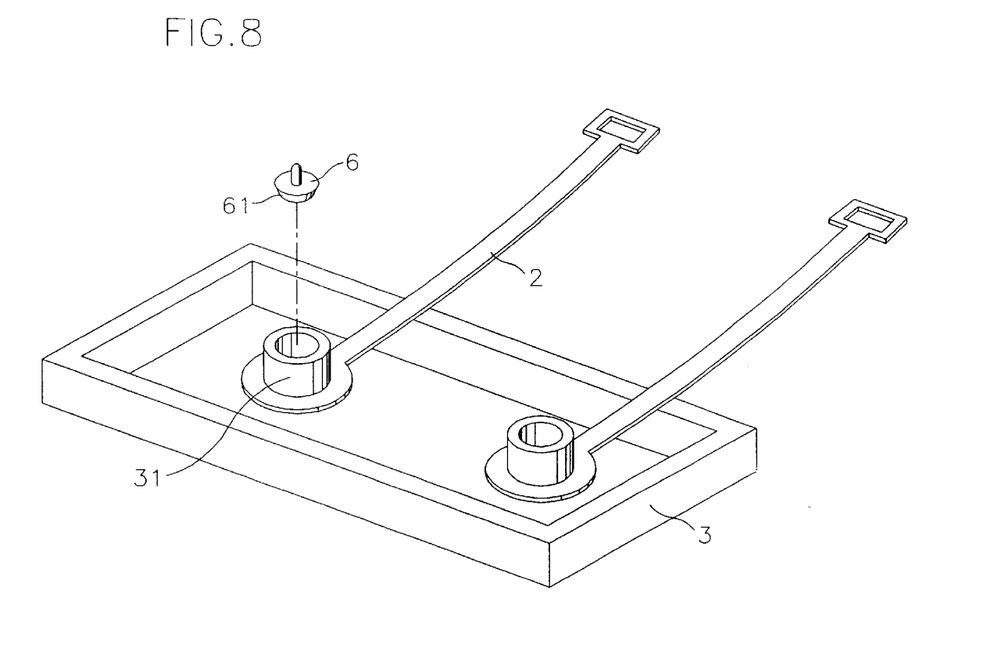
FIG. 8 is a perspective view for illustrating in detail the cap of the input/out ports made in accordance with an embodiment of the present invention.

Referring to FIGS. 7 to 12, the means for preventing the caps of the input/output and keyboard ports from being lost is composed of caps 3, 4 and flexible connecting members 2, 5 for connecting the housing body and the caps. The connecting members 2, 5 have hook portions for hooking the housing body at one end, as shown in FIG. 8. At the other end, ring-shaped portions are formed to hold the caps.

Figure 10:
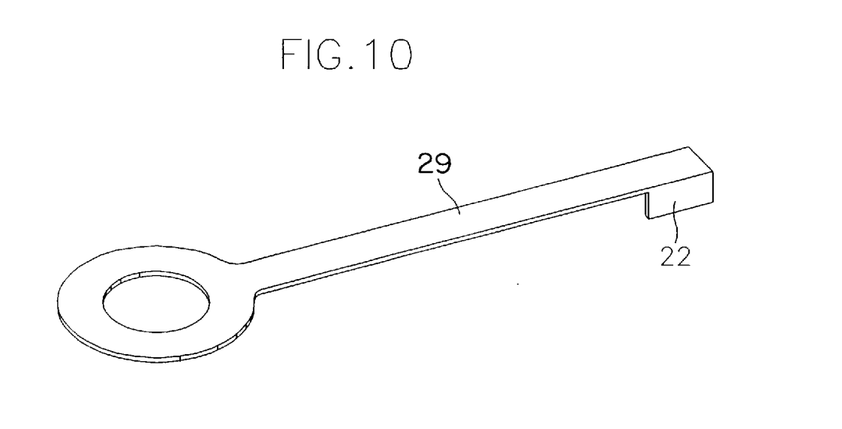
FIG. 10 is a perspective view for illustrating a connecting member for connecting a cap and a housing according to the present invention.
Figure 11:
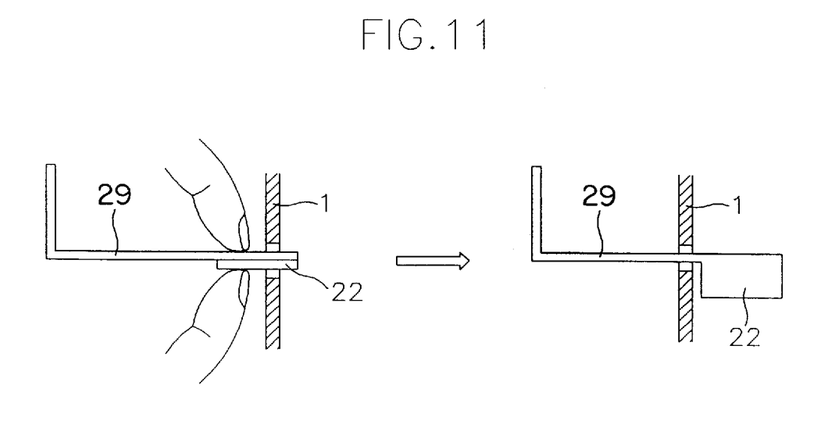
FIG. 11 is a cross-sectional view for illustrating the attaching action of the connecting member shown in FIG. 10.
Figure 12:
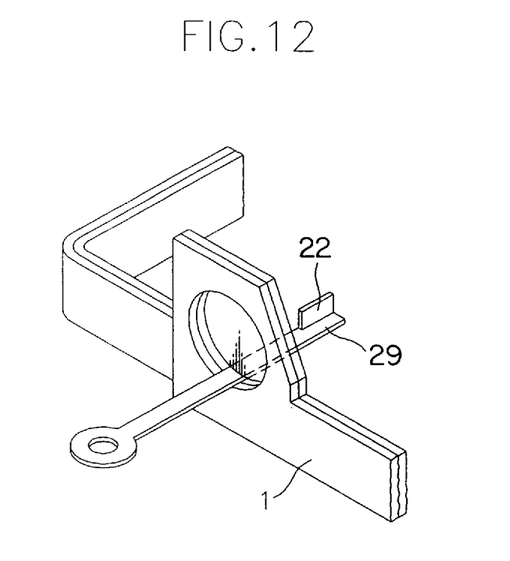
FIG. 12 is a perspective view for illustrating the connecting member attached to a housing of a portable computer.

Referring to FIGS. 10 and 11, the hook portions 22 of the connecting members 29 are made of resilient material so that they may be folded and recovered to hook the housing body when inserted into slits of the housing. In addition, the caps 3, 4 have resilient tube-like protuberances 31, 41 fitted into the ring-shaped portions.

Figure 9:
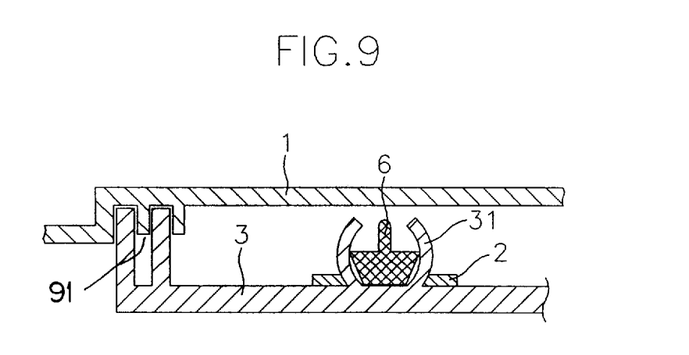
FIG. 9 is a cross-section of a cap attached to an output port of a portable computer in accordance with an embodiment of the present invention.

Referring to FIGS. 8 and 9, the tube-like protuberances 31, 41 are prepared to expand their middle portion to clutch the ring-shaped portions when stoppers 6 with a diameter greater than the inner diameter of the tube-like protuberances are inserted into the openings of the tube-like protuberances.

The stoppers 6 are so formed as to have the shape of a reversed truncated cone with the height being about half the depth of the opening of the tube-like protuberances 31, 41. The diameter of the upper end of the stopper is greater than the inner diameter of the tube-like protuberances and the diameter of the lower end. Preferably, the upper ends of the stoppers 6 have a knob.

According to an embodiment of the present invention, the tube-like protuberances 31, 41 are made of rubber, the connecting members 2, 5 of polyester resin and the stoppers 6 of plastic material. Of course, the materials are not limited to meet the above ends. Preferably, there are provided double flanges (i.e., Thresholds 91) around the portions (i.e., doors 71) of the computer housing 1 connecting to the input/output caps 3, 4, as shown in FIG. 7. Thus the caps 2, 5 of the keyboard and input/output ports 3, 4 are fixedly attached to the housing, thus securely kept from being lost.

Figure 13:
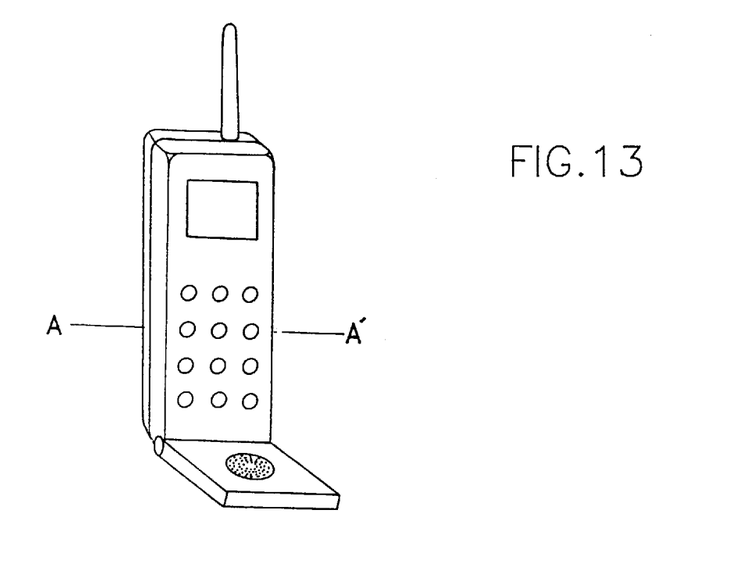
FIG. 13 is a perspective view for illustrating the outer surface of a handphone in which the present invention is preferably embodied.
Figure 14:
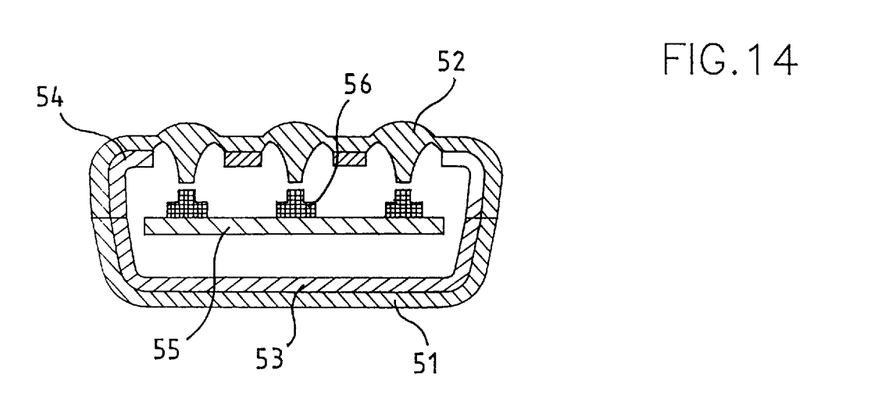
FIG. 14 is a cross-section of the handphone shown in FIG. 13 for illustrating a preferred embodiment of the present invention.

Referring to FIGS. 13 and 14, the present invention is also preferably embodied in a handphone. The housing body comprises an upper and lower covers 54, 53 and a resilient layer 52 coated thereon. The resilient layer 52 has a plurality of protuberances positioned in correspondence with the positions of a plurality of the operating switches mounted on the internal plate 55 within the housing body. The protuberances are formed so as to work the operating switches when pressed by fingers. Indication numbers are preferably indicated on the positioning surfaces corresponding to the positions of the operating switches 56, thus eliminating the necessity of providing additional buttons for operating the switches.

What is claimed is:

1. A housing for enclosing components of a portable electronic apparatus, the housing comprising:
    an upper case assembly for mounting a display device, the upper case assembly comprising:
        an internal part made of a plastic material;
        a tray gasket fitted to the internal part to mount the display device thereon;
        a plurality of bosses protruding from the internal part to mount the components of the electronic apparatus; and
        an outer part made of a rubber-like substance;
    a lower case assembly for mounting a battery to supply power to the electronic apparatus, wherein an internal part of the lower case assembly is made of a plastic material and an outer part of the lower case assembly is made of a rubber-like substance; and
    a main gasket formed between the upper case assembly and the lower case assembly for sealing space between the upper case assembly and the lower case assembly.

2. A housing as claimed in claim 1, further comprising supporting means coupled to a rear side of the main gasket for supporting the main gasket and preventing its bending.

3. A housing as claimed in claim 1, wherein the outer parts of upper case assembly and lower case assembly are formed by injection molding of a rubber-like substance on the internal parts thereof.

4. A housing for enclosing components of a portable electronic apparatus, the housing comprising:
    an upper case assembly for mounting a display device, wherein the upper case assembly has a plurality of bosses to mount the components of the electronic apparatus;
    a lower case assembly for mounting a battery to supply power to the electronic apparatus;
    a main gasket formed between the upper case assembly and the lower case assembly; and a water-resistant door formed on a rear side of the housing for input/output ports of the electronic apparatus, said water-resistant door including:

caps for covering the input/output ports, and a flexible connecting member for connecting the housing and the caps, wherein the connecting member has hook portions for hooking the housing at one end and ring shaped portions for holding the caps at the other end, the hook portions being made of a resilient material so that they may be compressed and subsequently expanded to hook the housing, and the caps having resilient tube-like protuberances to be fitted into the ringed-shaped portions.

5. A housing as claimed in claim 4, wherein the tube-like protuberances are prepared to allow their middle portions to expand when stoppers with diameters greater than inner diameters of the tube-like protuberances are inserted into openings of the tube-like protuberances in order to clutch the ring shaped portions and prevent them from slipping out of the tube-like protuberances.

6. A housing as claimed in claim 5, wherein the stopper has a shape of a reversed truncated cone with its height being about a half the depth of the openings of the tube-like protuberances a diameter of an upper end of the stopper being greater than a diameter of its lower end and the inner diameters of the tube-like protuberances.

7. A housing as claimed in claim 6, wherein the upper end of the stopper has a knob.

8. A housing as claimed in claim 5, wherein the connecting members are made of polyester resin.

9. A housing as claimed in claim 4, wherein thresholds are formed in duplicate on the rear side of the housing to fit with the water-resistant door.

10. A housing for enclosing components of a portable electronic apparatus, the housing comprising:

an upper case assembly for mounting a display device, the upper case assembly comprising:
an internal part made of a plastic material;
a plurality of bosses protruding from the internal part to mount the components of the electronic apparatus, and
an outer part of the upper case assembly is made of a rubber-like substance;

a lower case assembly for mounting a battery to supply power to the electronic apparatus, wherein an internal part of the lower case assembly is made of a plastic material and an outer part the lower case assembly is made of a rubber-like substance;

a main gasket formed between the upper case assembly and the lower case assembly for sealing space between the upper case assembly and the lower case assembly; and a supporting means coupled to a rear side of the main gasket for supporting the main gasket to prevent the bending of the main gasket.

11. A housing as claimed in claim 10, wherein the upper case assembly further comprises a tray gasket to mount the display device thereon and a display device gasket placed between the display device and the tray gasket.

12. A housing as claimed in claim 11, wherein the upper case assembly further comprises a lower support frame placed between the display device gasket and the tray gasket.

13. A housing as claimed in claim 12, wherein the display device is mounted on the lower support frame.

14. A housing as claimed in claim 11, wherein the upper case assembly further comprises at least one pad attached to a side of the lower support facing the tray gasket.

15. A housing as claimed in claim 14, wherein the lower support further comprises a pair of pads attached to left and right bordering surfaces of the lower support.

16. housing as claimed in claim 15, wherein the display device is mounted on the display device gasket.

17. A housing as claimed in claim 10, wherein the upper case assembly further comprises a water-resistant door formed on a rear side of the housing for input/output ports of the portable electronic apparatus wherein the water-resistant door comprises caps for covering the input/output ports and a flexible connecting member for connecting the housing and the caps.

18. A housing as claimed in claim 17, wherein the connecting member have hook portions for hooking the housing at one end and ring shaped portions for holding the caps at the other end, the hook portions being made of a resilient material so that they may be compressed and subsequently expanded to hook the housing, the caps having resilient tube-like protuberances to be fitted into the ring-shaped portions.

* * * * *